Aug. 7, 1945.   O. C. HEDIN   2,381,164
ART OF SHADOW SCREEN INSPECTION AND METHOD
AND ARTICLE RELATED TO THE SAME
Filed Dec. 10, 1942   4 Sheets-Sheet 2
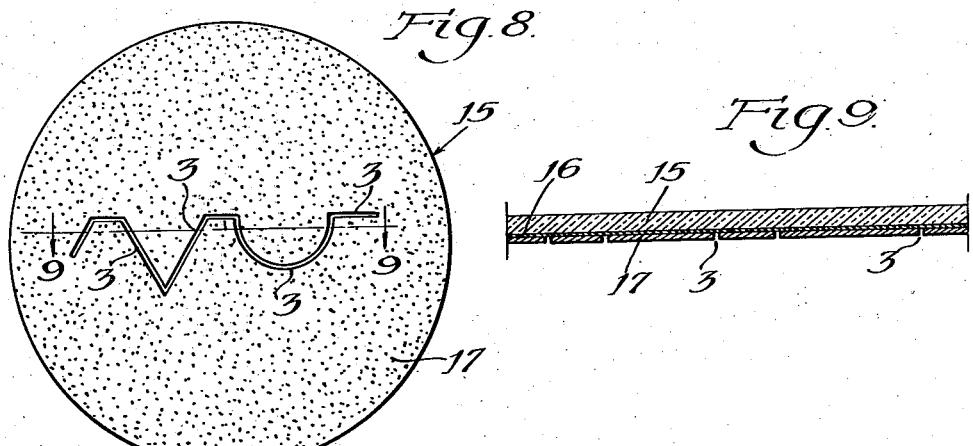
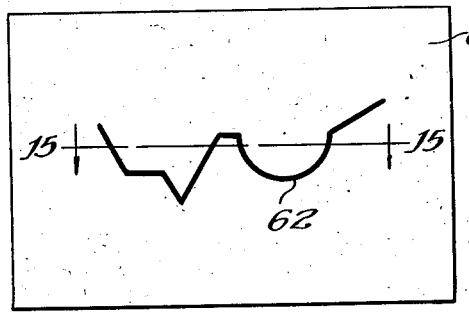
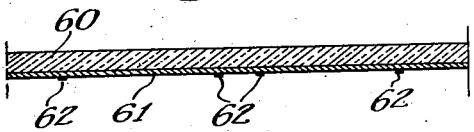
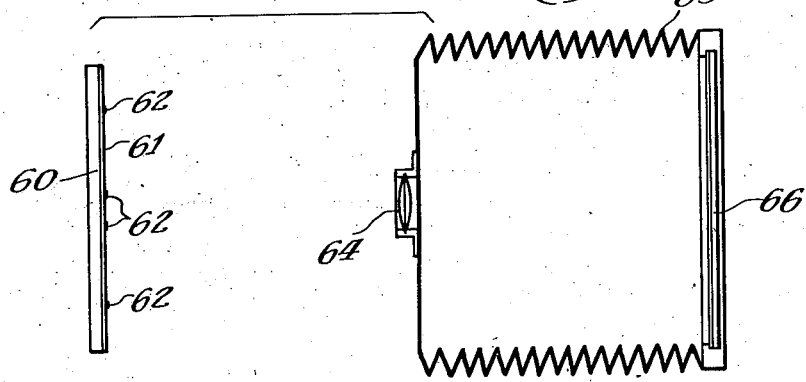
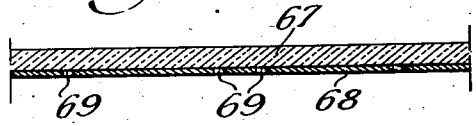
Inventor:
Oscar C. Hedin
By: Harold Olsen
Attorney Aug. 7, 1945.   O. C. HEDIN   2,381,164
ART OF SHADOW SCREEN INSPECTION AND METHOD
AND ARTICLE RELATED TO THE SAME
Filed Dec. 10, 1942   4 Sheets-Sheet 3
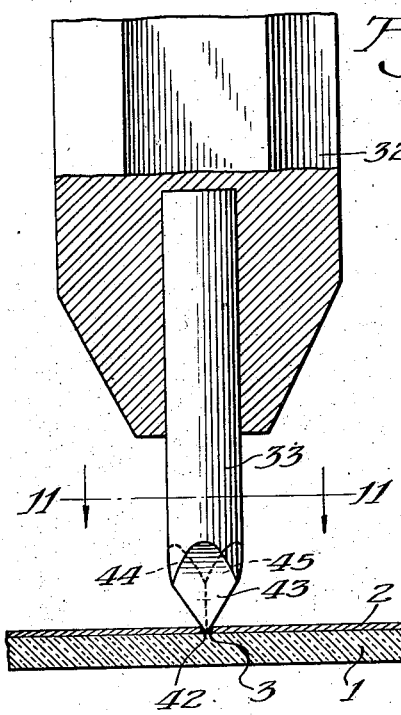
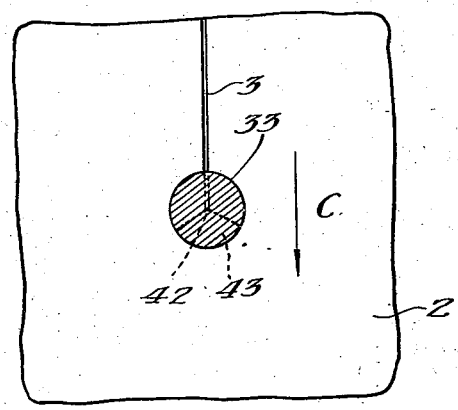
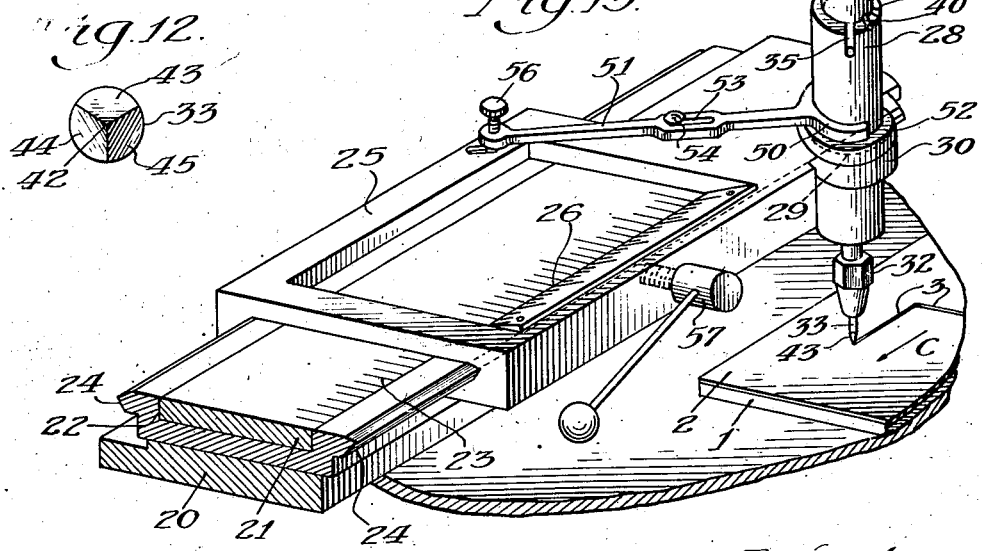
Inventor:
Oscar C. Hedin
By: Harold Olsen
Attorney.

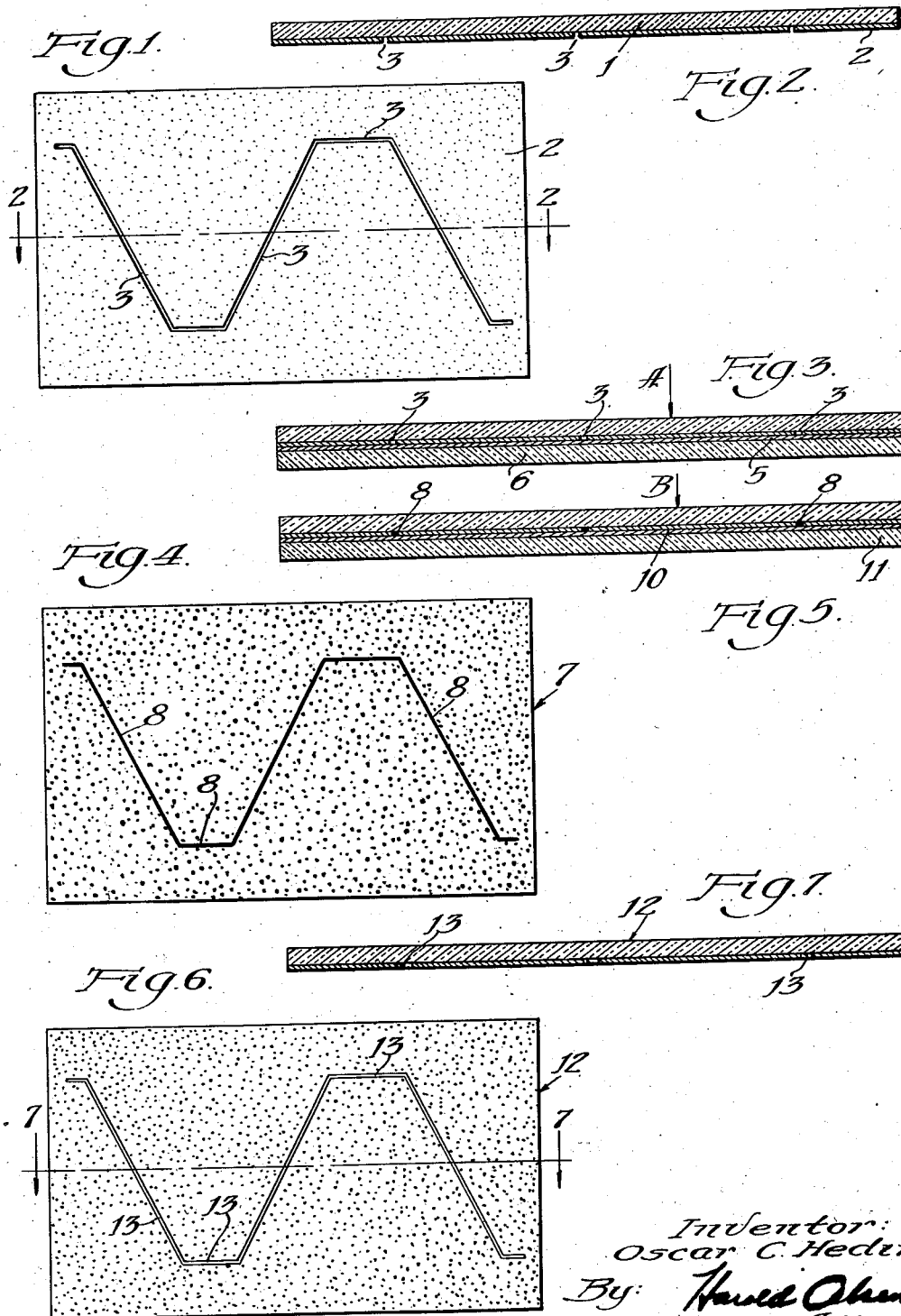

Aug. 7, 1945.   O. C. HEDIN   2,381,164
ART OF SHADOW SCREEN INSPECTION AND METHOD
AND ARTICLE RELATED TO THE SAME
Filed Dec. 10, 1942   4 Sheets-Sheet 4
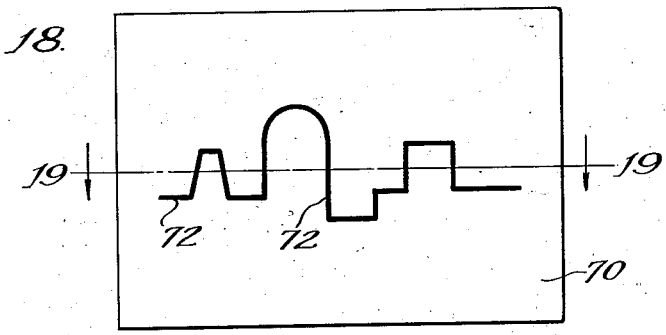
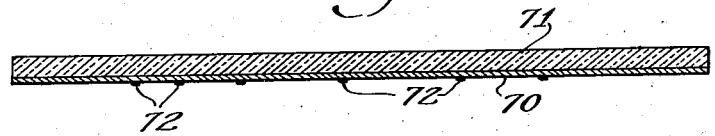
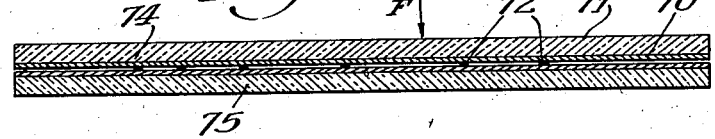
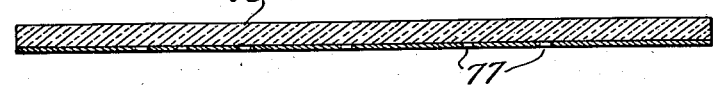
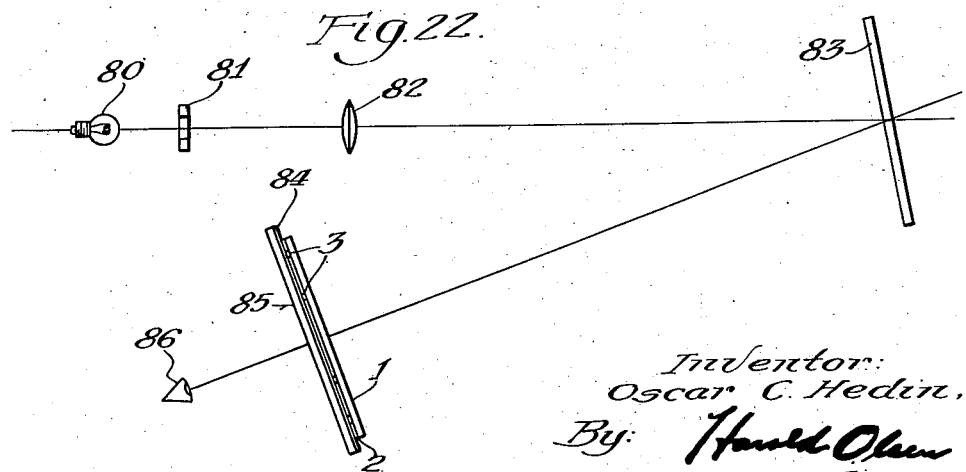
Inventor:
Oscar C. Hedin,
By: Harold Olsen
Attorney.

Patented Aug. 7, 1945

2,381,164

UNITED STATES PATENT OFFICE 2,381,164

ART OF SHADOW SCREEN INSPECTION AND METHOD AND ARTICLE RELATED TO THE SAME

Oscar C. Hedin, Cleveland Heights, Ohio, assignor to The Weldon Tool Company, Cleveland, Ohio, a corporation of Ohio Application December 10, 1942, Serial No. 468,557

1 Claim. (Cl. 88—24)

This invention relates to the art of optical inspection in which light is projected generally across the periphery of a piece to be inspected or checked, in a manner to form an enlarged profile shadow of the object on a shadow screen for comparison with an enlarged drawing or line-like delineation associated with that screen.

For many years it has been the invariable practice to intercept the light projected on the shadow screen by means of an opaque line drawing, thus requiring that the margin of the work shadow cast upon the screen be compared with a dark line in which the shadow margin could be lost. The loss of the shadow margins within those dark areas resultant from interception of the light by the opaque lines is a very objectionable occurrence and under certain conditions a costly one. Where the shadow of a cutting tool is observed in relation to the shadow of the periphery of the work during shaping and the operator is watching the progress of the shadow as it is virtually ground down, it happens that the shadow margin disappears in the opaque or dark line of the drawing. After this occurs grinding may continue until the shadow reappears on the opposite side of the line, in which case too much grinding may have taken place and the piece may have been ground too small or too large, or have been spoiled.

These optical inspection machines are also used for inspecting work after it has been taken out of the grinding or shaping machine for contour checking. In this case the work piece is mounted on a stage in such manner that the light can be passed across its periphery to obtain an enlarged profile shadow, and this enlarged shadow is projected onto the shadow screen for comparison with the conventional or dark or opaque line drawing. In this instance also the profile of the shadow can be lost in the opaque line.

In order to overcome the difficulties above mentioned and to do away entirely with dark-line drawing, I have conceived of a method of preventing dark-line interference by doing away entirely with the use of such light-intercepting opacity. This conception involves the method step of increasing the degree of transmission of light in those areas which correspond to the profile delineation, whereby to provide bright-line illumination in those areas. Thus, I prevent interruption of light in those areas which correspond to the outline of the master profile.

My invention involves: A method by which bright-line illumination is attained or by which interception of light in the delineation areas is prevented; a new article of manufacture by which this method can be carried out; the combination with an optical comparing machine of my means for obtaining bright-line illumination; a method or technique for very accurately making my article of manufacture; and methods for very accurately and relatively cheaply duplicating such articles in quantity. There are, therefore, a number of important phases to my invention, all based on the conception of increasing the degree of transmission of light in the areas which correspond to the profile delineation or of preventing dark-line interference with light transmission in those areas.

My invention includes the provision of means by which bright-line comparison is always attainable and also provides means which may be substituted for the ordinary shadow screen or ground glass of an optical comparing machine. My article also can be used in conjunction with the ordinary shadow screen or ground glass of such a machine.

The practice of my invention not only makes for much greater accuracy in comparing, but reduces eye strain to a minimum. The practice of the invention can also compensate in some degree for a lessened visual acuity of a user. With the bright-line illumination which I provide, error and waste are avoided to an extent never before possible, particularly when during grinding, changes in the shape of the work shadow are being observed.

An important object of the invention is to provide a method, not only for making the article having what I call bright line delineation thereon, but to provide a method of making master plates by using a coating of transparent or translucent emulsion on a piece of glass of good transparency and cutting away the emulsion to restore full transparency of the glass in those areas which correspond to the line delineation or profile drawing of the part. A feature of the invention is therefore the process or method for cutting emulsion for my purpose.

Other features include the method of reproduction of a cut plate by a photo-printing process; the production of plates in accordance with my invention and by a photo-optical method in which an opaque line drawing is involved; the production of an article of my invention by a photo-printing process in which an apaque line drawing on transparent or translucent paper or linen is involved; and all method details and details of construction disclosed herein, along with the broader aspects of the invention inherent in the disclosure.

Objects, features and advantages of the invention will be disclosed in the description of the drawings, and in said drawings—

Figure 1 is a face view of a master profile plate or screen or drawing made in accordance with the teachings of this invention;

Figure 2 is a cross-section taken on line 2—2 of Figure 1;

Figure 3 is a view illustrating one of the exposure steps of my method in accurately reproducing duplicate copies of the master plate of Figure 1 by a photo-printing process;

Figure 4 is a face view of the negative resultant from the exposure step of Figure 3;

Figure 5 illustrates the final exposure step of this method, using the negative of Figure 4;

Figure 6 is a face view of the final product resultant from the photographic development of the exposed negative of Figure 5;

Figure 7 is a cross-section on line 7—7 of Figure 6;

Figure 8 is a face view of an article of manufacture produced by applying a coating like that of Figure 2 directly to a piece of ground glass and then cutting the coating;

Figure 9 is a section on line 9—9 of Figure 8;

Figure 10 is an enlarged view showing the method removing the coating material of the plate to produce the article of Figure 1;

Figure 11 is a plan section on line 11—11 of Figure 10 showing the relation of the facets of the tool point to the direction of movement of the tool during cutting;

Figure 12 is an enlarged end view looking at the point of the tool;

Figure 13 is a perspective view showing a structure which may be used to mount and guide the tool during its cutting movements;

Figure 14 is a face view of a master profile plate from which may be produced by a single optical photographic procedure, an article like that of Figure 6;

Figure 15 is a section on line 15—15 of Figure 14;

Figure 16 is a diagram illustrating one step in my method of producing a final product like that of Figure 10 by a simple optical photographic method;

Figure 17 is a cross-section of that final product resultant from photographic development of the exposed negative of Figure 16;

Figure 18 is a face view of an article from which a final product like that of Figure 6 can be produced by a photographic printing process;

Figure 19 is a section on line 19—19 of Figure 18;

Figure 20 is a diagram showing the exposure step in the photographic printing of the article of Figures 18 and 19;

Figure 21 is a cross-section of the final product resultant from photographic development of the exposed negative of Figure 20; and Figure 22 is a view illustrating my method step and the combination of my master plate with the ground glass of a comparing machine in carrying out that step.

Referring first to Figures 1 and 2 which show a master profile drawing plate made in accordance with the teaching of this invention. The plate shown represents the preferred embodiment of this invention because it can be very accurately made and very accurately reproduced or duplicated by a simple photo-printing process.

In those figures of the drawings which relate to my products and to the processes related thereto, the showings are somewhat diagrammatic; thicknesses are exaggerated and other devices are resorted to for clarity of conception, rather than to achieve proportional accuracy.

The numeral 1 indicates a glass plate of good light-transmitting quality. Numeral 2 indicates a coating of suitable density on the plate. The application of this coating reduces the light-transmitting properties to the proper degree to afford optimum contrast with clear transparent areas, and/or to permit of light transmission for a photo-printing process. The numeral 3 indicates line-like areas in which the coating has been removed down to the glass in a manner to restore full bright-line transparency to the glass and to delineate a master profile drawing. Accurate duplicates of the article of Figures 1 and 2 can be made by line-like removal of the coating, and very accurate exact duplicates can be made from this cut master plate by a simple photo-printing process herebelow described and constituting an important feature of my invention.

Various materials may be used for coating the plate to provide a homogeneous light-transmitting film or layer of uniform thickness and optical density which can be cut through to the glass and cleanly removed, and which has the proper degree of light-transmitting ability whereby to permit observation of a sharp line shadow of a shadow screen. The degree of light transmitting ability of the coating can be varied to allow my plate to be used alone or in conjunction with the ground glass screen of an optical comparing machine. It will be understood that I may vary the quality of the covering material to obtain varying degrees of light-transmitting ability ranging from clear transparency to denser transparency or to translucency, depending on the specific uses to which the final product is to be put and upon the method of reproduction used in making duplicate plates.

A coating material which is useful and which can be properly cut is composed of a suspension of small particles of metallic silver in gelatin, treated so as to be particularly adaptable to clean line removal by a suitable cutting tool. This coating may be colored; it has a small coefficient of expansion; and is sufficiently hard to be permanent in storage and handling.

The degree of transparency of the coating or emulsion is important but is variable. Ordinarily the final product of this invention should be sufficiently transparent to permit one to see the outline of objects by looking through the plate after application thereto of the emulsion. After cutting and removing the emulsion down to the glass, line-like areas of clear transparency result and these areas are contrastedly related to an area of lesser transparency. In other words, both areas will transmit light for photographic printing and the larger area which is not cut will be suitable for the observation of a sharp shadow created by transmitted light.

When laid against the ground glass screen of a comparing machine, the light-transmitting quality of my plate is such that after passage of the light through and diffusion within that screen and through the plate, a clean-cut shadow is easily visible for comparison with the bright-line delineation of the plate.

I do not intend, however, to be entirely limited to the use of a transparent coating, because I may wish to provide a plate which acts as a ground glass in lieu of the ground glass of the ordinary comparing machine, in which case the coating will be translucent or will be rendered traslucent by a photographic procedure as hereinafter mentioned.

The character of the glass should be such that those areas which correspond to the master line delineation can be highly transparent to give a bright-line visual appearance during the inspection period and the remaining emulsion should be just sufficiently denser to allow the observation of a sharp shadow which can be compared to and oriented with the bright-line areas. Whatever the color or light-transmitting quality is, it should be proper for the purposes above. It will, therefore, be seen that first and foremost this invention provides a bright-line appearance in those areas which correspond to the line delineation, whether obtained by cutting away the emulsion or coating, or by photo-printing or by photo-optical methods. The remaining area of the coating is sufficiently light-transmissive to permit observation of or to give a shadow of the needed sharpness for comparison with the bright-line delineation.

I have referred to one kind of coating material which I have found to be useful and which is composed of a suspension of small particles of silver in a suitable emulsion or gelatin. I am not concerned with the manufacture of the material, nor with the application of such material to a glass plate. Manufacturers of the photographic films and coatings and emulsions are skilled in such matters as precipitation of silver from silver salts and in methods of dispersing such finely divided silver particles evenly in a suitable carrying medium and obtaining the proper proportion of all ingredients. The film or coating which I use is not light-sensitive in a photographic sense, but the material of the coating may be made by suitably modifying emulsion-making materials. Thus, the degree of light-transmitting ability and the degree of hardness of the coating can be varied as is required. No limitation is intended by mentioning the production of my covering material by the use of metallic silver in gelatin. Other materials can be used for my purpose. The film is quite thin and should be of even thickness throughout. It is sufficiently hard to allow the use of the scribing tool described herein to obtain clean, uniform line-width cutting and removal of the material.

When I use the expressions "master drawing" and "article of manufacture" I mean an article in which the line delineation is and must be entirely completed before the article is placed in operative relation in an optical comparing device or machine, and which article is capable of use with the shadow screen of such a machine. My article requires the greatest accuracy in its production, as will be evident from the description herein relating to the machine by which the "drawing" is accomplished.

Glass plates having a coating which is suitable for cutting by my process herein for the production of my article of manufacture, and having the required light-transmitting properties are obtainable under the trade-name "Kodak Scriber Plates," manufactured by the Eastman Kodak Company.

Although Figures 7, 17 and 21 are sectional views, yet no section lining has been used in those areas which correspond to the delineation. This has been resorted to to indicate that in my finished article all line-like areas are brightly transparent, and that there is great contrast between these line-like areas and the remaining denser or tinted area of the coating. In all views where delineation has been represented, line-width has been exaggerated. Of course, what may be designated as wide-line delineation may be sorted to, or double-line delineation may be used. All can be obtained by cutting suitable covering material.

The article of Figure 1 can be of any suitable size and any required or desired character of master delineation may be made and duplicates can be made to have a high degree of visual quality. As to the production of duplicates by cutting, this can be very accurately done by the use of a device disclosed in my copending application for Drawing machine or lay-out table, Serial Number 459,102.

Master plates of standard commonly used profiles such as screw thread profiles, gear tooth profiles, master angles, master radii, etc., may be produced by this line-like removal of the coating material to obtain maximum transparency in the cut area. Clean lines of uniform width varying from .006 inch to .003 inch can be cut by my method and means, and much greater accuracy as to line-width uniformity and profile dimension can be achieved by cutting as herein disclosed than by the use of lead pencil or ink lines as is usual in making profile master drawings.

Before describing my preferred method and means for cutting the emulsion or coating to produce the product of Figures 1 and 2, I will describe my process for obtaining accurate duplicates from said product. It will be understood, of course, that the article of Figures 1 and 2 can be used and accurately duplicated in any quantity on the machine of my above mentioned application, without resort to the following described method, but the method enables one to make accurate duplicates very cheaply. The only difference between the photo-printing duplicates of the method and those cut by machine being that there are no cut lines in the former. In the brightly transparent line-like areas of my plate of the photo-printing method the light passes through a very transparent portion of the developed photographic emulsion. It will be understood that this is the preferred manner of duplication, since I have found it to be the most accurate. The process involves a simple photo-printing or contact-printing process, along with the development of exposed photographic plates, in this case involving the exposure and development of two plates. A glass plate is preferable from the standpoint of dimensional stability in relation to changing temperatures and humidities. Yet I do not intend to be entirely limited to the use of a glass base nor to a stiff base.

Now, referring to Figures 3 to 7, inclusive. To obtain accurate reproduction of the article of Figures 1 and 2, its emulsion or cut face is placed as in Figure 3 against the face of the emulsion 5 of a suitable photographic plate 6. Light is then passed through in the direction of the arrow A, and a proper degree of exposure is given. After development of the photographic plate 6 a negative is produced and is designated by numeral 7, see Figure 4. The opaque line 8 of this negative is of exactly the same width as that of the width of the cut out area 3 of the article of Figures 1 and 2. The emulsion side of the negative 7 is then placed as in Figure 5 against the emulsion side 10 of a second photographic plate 11, and light is passed through the plate as shown by the arrow B. After development of the plate 11 the article 12 of Figures 6 and 7 is produced and the line 13 is for all practical purposes the exact duplicate in accuracy and light-transmitting quality as that of the article of Figures 1 and 2 and has the bright-line delineation areas which, however, are not cut areas as in Figures 1 and 2. Both original and duplicate are capable of giving bright-line and easy shadow observation under the conditions of their use.

As made at present, the article of Figure 1 is transparent and has a very thin coating which has a faint brownish tint as viewed by transmitted light; the developed negative shown in Figure 4 is substantially less transparent than the article of Figure 1, and the final article of Figures 6 and 7 is less transparent than the article of Figure 1 but is considerably more transparent than the article of Figure 4, and has a grayish tint as viewed by transmitted light. No limitation is intended by this statement. I have only described the appearance of one of my articles as it actually is. In the drawing stippling has been used to differentiate the light-transmitting quality of the plates of Figures 1, 4 and 6, but no limitation is intended, and this convention is not necessarily meant to represent a ground glass quality, although my screens or plates may have a shadow-giving quality comparable to ground glass. The "color" or light-transmitting quality of the coatings may be varied to suit use requirements. The glass has excellent light-transmitting quality and has the thickness of an ordinary glass photographic plate. Of course, the invention is not limited to the use of a stiff backing nor to the use of glass, yet glass is the most practicable material and stiffness is most desirable for my present use.

My invention is useful under any conditions wherein accurate comparison or registration is required between a shadow and a line so that I do not consider this invention entirely limited only to use with optical inspection machines and to tool shadow comparisons.

Now it may be desirable to produce an article of manufacture which can be placed in the frame of an optical comparing machine and/or be substituted for the usual shadow screen or ground glass of such a machine. In this case a cut-emulsion master plate or a duplicate of the same made by the above process can be used and it can be of circular shape as shown in Figure 8. The article of Figures 8 and 9 is like that of Figures 1 and 2. Both are produced by cutting and removal of emulsion or other suitable material. In this case the ground glass surface 16 of a circular piece of glass 15 is coated with a suitable material 17, as previously described, and then the master delineation is made by cutting and removal of the material down to the ground surface of the glass, as shown at 3. Figure 9 shows a cross-section on line 9—9 of Figure 8.

The previously described photo-printing method is used for reproducing the article of Figures 8 and 9, just as it was used for reproducing the article of Figures 1 and 2. The only difference is that this article can be substituted for the ordinary ground glass, instead of being attached to the ordinary ground glass or shadow screen. This is a valuable feature of the invention.

In cutting the emulsion as placed on the ground glass side of a piece of ground glass, care is exercised to make the cut while applying an optimum amount of axial pressure to the cutting tool so as to accomplish clean line removal without adversely marring the ground glass surface.

It will be understood that gradations in light-transmitting quality of the articles of my invention when the same are made by a process involving photography, can be obtained by varying the time of exposure, and this is true for photo-printing as well as for photographic optical methods.

Now referring to the process of making the article of Figures 1 and 2. Referring to Figures 10, 11, 12 and 13. By experiment I have found that the manner of shaping the tool and the manner of its use are important in the production of the emulsion-cut article of Figures 1 and 2, and these procedures are features of this invention.

To make the master profile delineation by cutting away emulsion or other suitable coating material, the formation or shape of the point of the tool, the rapid motion of the tool and the proper placing of the facets of the tool in relation to the direction of motion of the tool are important factors in getting clean-cut and uniform removal of the material.

In Figure 13 I have illustrated one form of holder which is usable for my cutting tool, a similar construction having also been shown in my copending application Serial No. 459,102 for Drawing machine or lay-out table. It will be understood that the tool must be rigidly held in a certain position while in contact with the emulsion during cutting.

The numeral 20 indicates a suitable base or bar upon which is mounted a saddle 21 having a longitudinal groove 22 in which a scale 23 is fixed. The longitudinal sides of the saddle have V-shaped ways 24. The scale is provided with a slide 25 movable along the ways, and this slide carries a vernier 26 cooperable with the scale. This slide 25 carries my cutting instrument or scriber. Means is provided so that the tool can be translated to nonoperative position or can be removed, so that another scriber can be substituted. A suitable weight or weights (not shown) are provided to press the tool with the proper degree of force against the emulsion to be cut, and to hold the tool in such operative position during cutting.

The scriber-supporting means includes a tubular bushing 28 which fits in and extends through an opening 29 in an arm 30 of the slide. A scriber body or holder 31 is slidable and rotatable in the bushing 28 and at its lower end has a suitable chuck 32 which securely holds the scriber 33. In Figures 10, 11 and 12 the scriber has been considerably enlarged to more clearly show the structure of its point. I use a short "carbide" tip or other very hard material which is about one-sixteenth of an inch in diameter or larger. The height of the pyramid is about equal to the diameter of the tool.

The upper end of the bushing 28 is provided with two axially extending slots 35, 37 which are spaced apart 90°, and also has a relatively shallow slot 38 which is located between the two slots 35, 37. The body or holder 31 carries a radial pin 40 which when engaged in the shallow slot 38 holds the body in a relatively elevated inoperative position so that the tool will not contact the emulsion. When the pin is moved into one or the other of slots 35, 37, the point will engage the emulsion for cutting. A weight (not shown) is applied on the upper end of the scriber body 31. The point of the stylus has, as shown in Figures 10, 11 and 12, the form of a triangular pyramid. My process requires a particular placement of the facets of the triangular pyramidal point during cutting. The cutting point 42 is really the apex of a triangular pyramid, and its faces are respectively indicated at 43, 44, 45. Any one of the faces of the pyramidal point is arranged perpendicular to the direction of movement of the tool and is faced in the direction of movement of the tool. Face 43 is shown so placed and faced. When any one of the three equal facets is placed as described, detachment of the material, as distinguished from mere displacement, is obtained.

The slots 35 and 37 provide means whereby the tool facet can always be brought to this position preparatory to cutting. The scriber assembly is held against accidental withdrawal by a fork 50 of a clamping bar 51, said fork receiving the holder and engaging against a collar 52. The fork is brought into clamping engagement with the collar by first moving the bar longitudinally and this is accomplished by means of the slot 53 and headed pin 54. For clamping, the end of the bar 51 is lifted by means of the thumb screw 56 and lifting action causes the bar to fulcrum on the pin 54, thereby pressing the fork against the collar. When the scriber holder is to be removed the thumb screw is rotated in the opposite direction to release the clamping pressure of the fork on the collar and then the bar is translated to withdraw the fork to a position laterally of the collar.

Means 57 for clamping the slide 25 is provided and then bar 20 is moved in a direction perpendicular to its long dimension for cutting purposes, all in the manner set forth in my application before referred to.

Of course, any suitable means can be used for holding the tool and for firmly holding it with one of its facets faced in the direction of movement and at right angles to that direction. The structure of Figure 13 shows one means for positively holding the tool so that my cutting process can be carried out.

Figures 10 and 11 show the tool in the act of cutting through the emulsion. In Figure 11 dotted lines show the divisions between the facets of the triangular pyramidal point. The arrow C of Figure 16 shows the direction of the cut 3 and shows part of the cut as completed. Figure 10 shows the relation of the point to the emulsion and to the surface of the glass plate. Figure 12 is a view looking at the point after it has been turned through an arc of 180° from its position in Figure 11.

The width of the scribed or cut line may be varied by varying the character of the pyramidal point. A fine line is best. Its width may range from .003 inch to .006 inch. To get a fine line the tool should be ground to the finest possible point and the material of the tool should be hard enough to resist wear, since it comes in sliding contact with glass. It should not be so brittle as to be weak when formed into a delicate and accurate point. A hard steel or "carbide" tool is practicable, but industrial diamond may be used. The point of the tool should be exactly on the long axis of the cylindrical body so that whatever facet is faced in direction of the cut, the point will occupy the same position in relation to other parts of the machine by which the movement of the tool is being controlled. This has to do with drawing accuracy.

The width of the bright-line area as made by the use of my invention can be predetermined and made to conform with the gauging or tolerance limits of the work piece in question so that the shadow will fall within a transparent and brightly illuminated area. The finer the line the closer and more accurately can the comparison be made. Uniformity of line width is important and my cutting method results in greater uniformity of line width than is possible when opaque material such as that of a lead pencil or such as ink is used.

After production of a master plate by cutting to provide the transparent line profile, the cut surface may be protected from marring and from finger marks incident to handling and storage by means of a suitable transparent lacquer which may be applied with a brush. Thereafter, finger marks may be removed from the lacquer by using a pledget of cotton which has been moistened in a soap and water solution.

The plates may vary in size from 4 x 5 inches up to 14 x 17 inches. There is, of course, no limitation intended by this statement. It is made merely to show that various sizes of master plates may be made by cutting.

While I believe that the most accurate way to produce and duplicate my article is by the methods previously described, yet I have found that duplicate profile drawing plates can be made from a master plate which has a drawing thereon made with opaque lines. Reproduction from such an opaque line drawing can be made either by a simple photographic procedure which includes a photographic lens, or by a simple photo-printing process as previously described, except that the exposure of only one negative and its development is necessary.

I believe that no photographic scheme of reproduction by the use of a lens is as satisfactory in every respect as that of my photo-printing process, as related to my cut-emulsion plate. I do not believe that as accurate line-width uniformity can be obtained by opaque line drawing as is obtained by my scheme of emulsion-cutting, yet I have discovered a method of making a product somewhat like that of Figures 6 and 7 by the use of a copy camera. This method involves the use of opaque line delineation of the master profile drawing on opaque paper or other suitable opaque medium. From this a product having the bright-line and other visual qualities of the cut plate of my invention is produceable. I therefore describe and claim this process by which a bright-line delineation plate results. Since I have found ways or methods of making a bright-line delineation plate other than by cutting the emulsion, I consider the now-to-be-described methods to be related to the broader aspects of my invention.

Referring first to Figures 14 and 15. The numeral 60 indicates a glass plate of good transparency, to the face of which has been suitably attached a piece of opaque paper indicated at 61. Here we have an opaque layer on a transparent base. This paper is preferably of gray shade. When the paper of this color is photographed with the proper time exposure, the resultant negative after development gives a sufficiently transparent or sufficiently translucent background for the purpose herein. Any suitable shade of paper or any degree of photographic exposure may be used. The numeral 62 indicates a drawing made on the opaque layer by means of the application of opaque material such as lead pencil or ink.

In using the article of Figure 14 in carrying out my process for the producing of a final product which has substantially the same qualities as the articles of Figures 6 and 7, I photograph the face of the article preferably using an ordinary copy camera in the manner shown in Figure 16, which is a diagram. The surface of the article of Figure 14 is placed at the proper distance from the lens 64 of the camera 65, and a suitable photographic plate 66 in the camera is spaced an equal distance from the lens at the opposite side thereof. A suitable time exposure is made and then the plate 66 is developed, to produce the article shown in Figure 17, which has a transparent base indicated at 67 with a transparent or translucent area indicated at 68 providing therein bright-line areas indicated at 69. This article of Figure 17 has the desirable quality of bright-line transparency and the method of producing it is considered a valuable feature of this invention. While a one to one distance ratio has been above mentioned, there is no intention to be limited entirely to that ratio.

I have found a second method involving the use of opaque line drawing from which I can produce the article of my invention. This can be accomplished by a simple photoprinting process. Referring to Figures 18 and 19. In this case I attach a piece of transparent paper 70, such as tracing linen, to a piece of glass 71 of good transparency. Here we have a transparent base and a transparent or translucent layer. On this tracing linen or equivalent transparent material I make an opaque line drawing indicated at 72, using either ink or pencil. The article of Figure 19 is then placed against the emulsion side 74 of the photographic plate indicated at 75, as shown in Figure 20. A photographic exposure is made with the light passing in the direction indicated by the arrow F. The plate 75 is now developed in the usual manner to produce the article shown in Figure 21 and generally indicated by the numeral 76. This article provides a bright line area indicated at 77 and as to general visual characteristics is substantially the same as the article in Figures 6 and 7.

A modification of my invention involves the substitution for the plate 11 of Figure 5 of a piece of ground glass having its ground glass face coated with a suitable photographic emulsion. The coating of the article of Figure 4 is laid against the photographic coating of the ground glass plate, and exposure to light for the proper length of time is made. The time of exposure is such that after development the surface coating will be of sufficient transparency to exhibit to an observer a shadow which may have been cast upon the ground glass.

In Figure 22 I have illustrated my broad invention herein involving the method step of increasing the transmission of light in those areas which correspond to the lines of the profile delineation, that is, preventing interception of light in those area. In this drawing increased transmission or prevention of interception of light has been accomplished by placing my article of manufacture in operative relation to the shadow screen of a comparing machine. The view is diagrammatic. The numeral 80 indicates a light source, 81 a piece of work, a shadow of which is to be projected. Numeral 82 represents a suitable optical system by which the shadow of piece 81 is enlarged and projected onto mirror 83. In this instance my plate, either a cut plate shown in Figure 1 or the reproduction shown in Figures 6 and 7, has its emulsion side 2 laid against the ground surface 84 of the shadow screen 85. The light is reflected from a mirror 83 through the assembly, while the assembly is viewed by an observer positioned at 86. This combination with a ground glass, of my plate having bright-line areas 3 is believed to be new, as well as my method, and therefore my plate is also claimed in this combination. When my article is used its emulsion surface should be in contact with the surface of the screen to avoid adverse refractive and parallax effects.

It is to be understood that by the practice of my invention, plates having varying degrees of light transmitting quality can be produced for use as shadow screens per se, or for use with shadow screens of standard contour comparing machines. It will be further understood that in the processes of photographic or photo-printing reproduction, various amounts of exposure to light may be resorted to and that various proper shades and colors of covering material may be used on the glass base of good transparency.

For years the master profile delineations of plates adapted for the use herein have always been opaque, so that the shadow outline would become lost in this opaque line, resulting in less accurate comparison work and in "overshooting," which overshooting corresponds to overcutting or grinding of the metal piece being shaped. By the practice of this invention such brilliant contrasts are obtained that much more accuracy is obtainable.

It will be understood that gradations in light-transmitting quality of the articles of my invention, when the same are made by a process involving photography, can be obtained by varying the time of exposure, and this is true for photo-printing as well as for photographic optical methods.

In ordinary optical inspection devices the light crosses the periphery of the work piece to produce a shadow which is then magnified and projected onto the screen. In this case light is intercepted, due to the opacity of the work piece. By the use of my bright-line delineation method a face of the object can be illuminated so that the object can be seen on the screen by light reflected from that face or surface. Thus, surface structure or finish may be seen on the screen or the size and shape of a recess or depression which may not extend through the piece may be so seen. In this method of projecting and viewing by reflected, instead of by transmitted, light my bright-line delineation method also has obvious advantages.

I claim as my invention:

A chart or master drawing adapted for use with the screen of an optical inspection machine comprising, a substantially transparent base material having thereon a material providing a field adapted to visualize a shadow, portions of said field material being modified to provide line delineations made to scale and representative of an enlarged scale drawing of the profile of an article to be inspected, which modified portions are substantially more transparent to the passage of light than is the shadow-receiving material of said field.

OSCAR C. HEDIN.